United States Patent [19]

Okubo

[11] 4,344,004
[45] Aug. 10, 1982

[54] DUAL FUNCTION TRANSDUCER UTILIZING DISPLACEMENT CURRENTS

[75] Inventor: Shigeo Okubo, Menlo Park, Calif.

[73] Assignee: Design Professionals Financial Corp., San Francisco, Calif.

[21] Appl. No.: 189,546

[22] Filed: Sep. 22, 1980

[51] Int. Cl.³ .............................................. H04R 19/00
[52] U.S. Cl. .................................................... 307/400
[58] Field of Search ....................... 307/400; 365/146; 29/592 E; 361/233; 329/198

[56] References Cited

U.S. PATENT DOCUMENTS 4,224,540  9/1980  Okubo .................................. 307/400

OTHER PUBLICATIONS

Institute of Electric Engineers Conference on Dielectric Materials, Measurements & Application–London, England, No. 67, 1970, pp. 146–149.

Primary Examiner—James W. Moffitt
Attorney, Agent, or Firm—Townsend and Townsend

[57] ABSTRACT

A transducer for detecting the position of a mass includes a base, a mass disposed above the base and ohmically separated therefrom, a piezoelectric transducer for inducing relative motion between the base and the mass, typically by suspending the mass on a fluid oscillating at high frequency, an electric field generator on one of the base or the mass, and a conducting antenna on the other of the base or mass for detecting the position of the electric field with respect to the base. The oscillating fluid both supports the mass and generates displacement currents by creating relative motion between the mass and the base.

11 Claims, 4 Drawing Figures

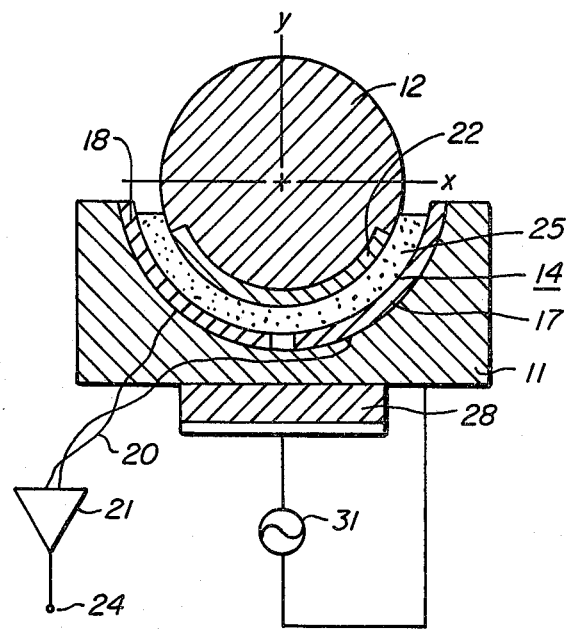
FIG.__1.
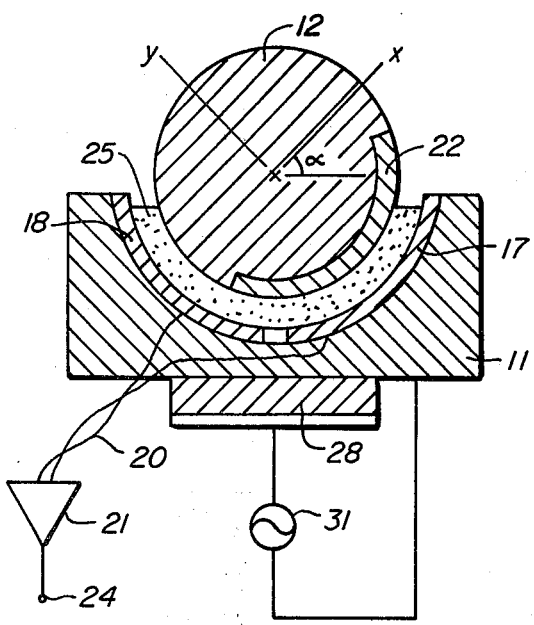
FIG.__2.
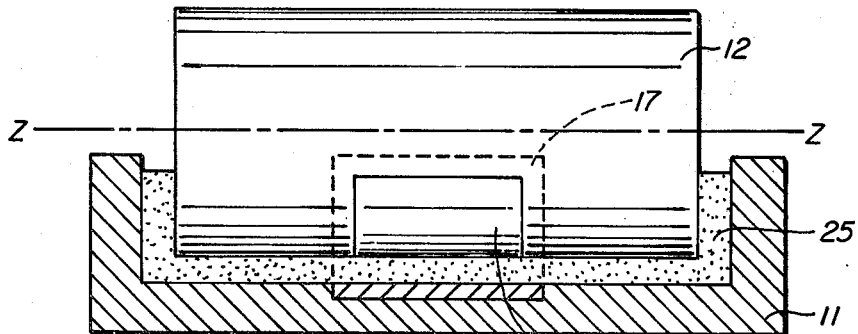
FIG.__3.
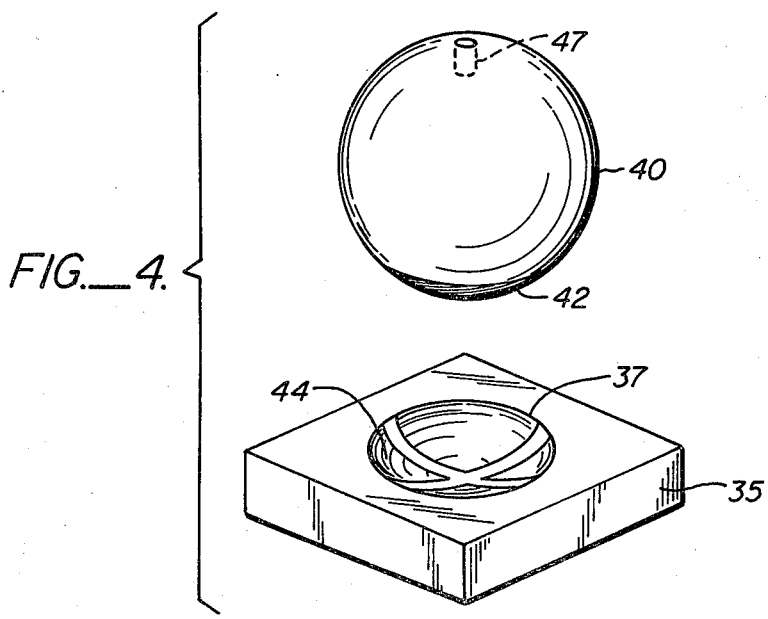
FIG.__4.

DUAL FUNCTION TRANSDUCER UTILIZING DISPLACEMENT CURRENTS

BACKGROUND OF THE INVENTION

1. Field of the Invention

This invention relates to sensors used to detect the position or motion of an object with respect to another object, and to sensors for detecting such position or motion by utilizing displacement currents. In particular the invention relates to detecting the position or motion of a rotating object with respect to a bearing surface on which the object moves.

2. Prior Art

Many types of sensing devices are known which are capable of generating electrical signals in response to the relative motion between two or more elements. Examples of such devices are electromagnetic transducers, in which relative motion between an electrically conductive coil and a magnet produces electrical current signals; electret transducers in which relative motion between an electret member and another member produces an electrical current; piezoelectric transducers, triboelectric transducers and strain gauges. All electromagnetic transducers function in accordance with the principles enunciated by James Clerk Maxwell, usually expressed in the form of the well-known equation by Maxwell extending Ampere's Law:

$$\phi_c \overline{\beta} \cdot dl = \mu_0 \left[ \epsilon_0 \frac{d\phi_E}{dt} + i \right]$$

where $\mu_0$ is the permeability of air, $\epsilon_0$ is the permittivity of air, $\phi_E$ is the electric flux, $\beta$ is the magnetic induction, and l is the length of a closed loop ohmic conductor. The quantity i is the conduction current flowing in the conductor 1, while the quantity $$\left[ \epsilon_0 \frac{d\phi_E}{dt} \right]$$

is termed the displacement current. This equation illustrates the interrelationship between a magnetic field and two electrical quantities: viz., the conduction current and the displacement current. The equation also shows that a changing electric field acts as a source for a magnetic field in the same manner as the conduction current acts as a source for a magnetic field. The conduction current is indicative of charges moving along an ohmic conductor, while the displacement current has the dimensions of a real current even though charges are not transported along an ohmic conductor. Thus, a magnetic field may be established in two ways—by a changing electric field (the displacement current term); and by a conduction current (the conduction current term).

In most known electromagnetic sensors and transducers a changing magnetic field generates the electrical current signal, and only the conduction current is sensed because the magnitude of the displacement current is negligible compared to the conduction current. While transducers which employ the conduction current are generally quite useful, certain limitations inhere in any transducer of this type. Because such transducers require an ohmic circuit for the conductive current, varying electromagnetic radiation in the vicinity of the circuit (which is usually coupled to amplifying and measuring circuitry) produces spurious conductive current signals which may mask the information conveyed in the conductive current signals generated by the transducer. Accordingly, shields are required to protect the circuit from stray electromagnetic radiation. Such shields make the structure of the transducers and the circuits undesirably complex. Conductive current sensors frequently require the application of electrical power to the circuit to enable the device to operate. The need for electrical power is particularly undesirable in applications requiring the installation of many sensors. In such situations either individual sources of electrical power must be installed at the site of each sensor or wiring must be provided from a central source to each sensor.

SUMMARY OF THE INVENTION

The invention comprises a transducer which senses the displacement current induced in an electrically conductive Gaussian surface by a varying electric field which is created by motion of the object whose position or motion is being sensed. The motion of the object which causes the varying electric field may be of extremely small amplitude. For example, the object whose position or motion is being sensed may be supported by a fluid in which high frequency oscillations are present.

In one embodiment the invention comprises a base, a mass disposed above the base and ohmically separated from the base; means for periodically inducing relative motion between the mass and the base; field means for generating an electric field disposed on one of the base or the mass; and a plurality of electrically conductive means, at least one of which is disposed on the other of the base or the mass to interact with the field means, the interaction of the at least one electrically conductive means with the field means inducing a displacement current in at least one of the electrically conductive means related to the position of the mass.

In a simple embodiment used to detect the position or motion of a spinning cylindrical shaft, the shaft is supported by a fluid bearing above a cylindrical depression in a base region. A portion of the surface of the shaft includes an electret, while a portion of the surface of the base includes two conductive plates. A piezoelectric element oscillating in a range of between 10 kH and 50 kH is attached to the base and used to excite high frequency resonant surface waves on the base. These high frequency waves cause the fluid supporting the shaft to oscillate at the same frequency. The relative motion between the spinning shaft and the base caused by the oscillations in the fluid generates displacement currents which are detected by the conductive plates in the base. As the shaft rotates or otherwise changes position, unequal areas of the electret are projected onto the conductive plates to thereby generate a differential signal related to the angular position of the shaft with respect to the base. This signal may be detected by the conductive plates and amplified or otherwise decoded to generate information concerning the position or motion of the shaft.

In another embodiment used to detect the position of a sphere with respect to a base, one or more regions of electrets are formed on the surface of the sphere. The base includes one or more conductive regions. The position of the electrets on the sphere with respect to the conductive regions on the base will cause displacement currents to be generated from which the position of the sphere may be accurately determined. The cylindrical and spherical embodiments are referred to herein as "dual function" transducers because the oscillating fluid creates relative motion between the object and the base generating the displacement currents while simultaneously supporting the object.

BRIEF DESCRIPTION OF THE DRAWINGS

FIG. 1 is an end view of a cylindrical embodiment of the invention showing the electret positioned equally over each of the electrically conductive plates;

FIG. 2 is an end view of a cylindrical embodiment of the invention showing the effect of rotation of the shaft on the position of the electret;

FIG. 3 is a side view of the structure shown in FIG. 1.

FIG. 4 is an exploded view of a spherical embodiment of the invention.

DETAILED DESCRIPTION

All embodiments of the invention function by measuring the Maxwell displacement current generated whenever an electric field changes with time. A more detailed description of the Maxwell displacement current and its measurement may be found in my United States patent issuing from application Ser. No. 932,582, entitled Displacement Current Sensor and filed on Aug. 10, 1979 now U.S. Pat. No. 4,224,540.

FIG. 1 shows a cross-sectional view of one embodiment of the invention. As shown in FIG. 1, a mass 12 is supported above a base 11. Although in the embodiment depicted, mass 12 has a circular cross section, it should be understood that this is not critical, and that other, arbitrarily chosen, geometrical configurations may be used. Similarly, the depression 14 in base 11 may be any desired shape, although as shown in FIG. 1 it is a circle of radius greater than the radius of mass 12.

Formed on the surface of base 11 and ohmically separated therefrom are two electrically conductive regions 17 and 18. Electrodes 17 and 18 may also be any desired shape, however, in the embodiment shown they are rectangular and are ohmically isolated from each other. A pair of conductive leads 20 are used to connect electrodes 17 and 18 to desired external circuitry. As will be explained, conductive regions 17 and 18 function as a split antenna to detect the position of electret 22 formed on the surface of mass 12. Electret 22 in one embodiment is a piece of Teflon.

In the embodiment shown in FIG. 1, mass 12 is supported above base 11 by a dielectric fluid 25. Although in one embodiment mass 12 may simply float on fluid 25 to be thereby supported above base 11, in the embodiment depicted in FIG. 1, mass 12 is supported by high frequency fluid waves in dielectric fluid 25. These high frequency fluid waves are generated by a piezoelectric element 28 which is energized by an oscillating signal from generator 31. In one embodiment of the invention the piezoelectric element oscillates at between 10 kHZ and 50 kHZ. Although almost any frequency of oscillation will serve to create the displacement currents, higher frequencies have been found more advantageous because of the resulting higher displacement currents generated. The higher displacement currents increase the sensitivity of the transducer.

By selecting the proper frequency of oscillation for piezoelectric element 28, high frequency resonant surface waves may be generated on the surface of base 11. These high frequency waves cause the fluid 25 to oscillate at the same frequency and thereby support the mass 12. In addition, the high frequency waves in fluid 25 cause displacement currents to flow in the fluid gap between the surface of mass 12 and the surface of base 11. Such displacement currents are described more fully in the United States patent noted above. The displacement currents are detected by the split antenna comprised of conductive regions 17 and 18 on base 11.

The usefulness of the structure depicted in FIG. 1 to detect position and/or motion of mass 12 may be more readily understood by reference to FIGS. 2 and 3. FIG. 2 is also an end view of the dual function transducer of this invention. In FIG. 2, elements which correspond to the elements shown in FIG. 1 are given the same reference numerals. As shown in FIG. 2, mass 12 has been rotated, with respect to its position in FIG. 1, through an angle alpha with respect to the horizontal. In FIG. 1 electret 22 is disposed equally over each of conductive regions 17 and 18, while in FIG. 2, as the result of rotation of mass 12 through the angle alpha, electret 22 is positioned unequally over conductive regions 17 and 18. As a result, unequal electric fields are projected onto conductive regions 17 and 18, to thereby generate unequal displacement currents across fluid gap 25. By connecting electrodes 17 and 18 through leads 20 to a differential amplifier, a signal will be detected which indicates the magnitude of the angular displacement alpha.

With the mass 12 in the position depicted in FIG. 1, the displacement currents generated will be related to the frequency of excitation of base 11. Therefore, a differential amplifier 21 connected to leads 20 in FIG. 1 would produce a zero level output signal at terminal 24. In contrast, a differential amplifier 21 connected to leads 20 with mass 12 in the position shown in FIG. 2 would produce an output signal at terminal 24 proportional to the displacement angle alpha superimposed on the displacement current generated as a result of the oscillations of base 11. The Precision Monolithics model OP-7 or the Burr Brown model 3523 operation amplifiers have been found satisfactory for detecting and amplifying the output signal from the sensor on leads 20.

A cross-sectional view of the structure shown in FIG. 1 taken along the y axis as designated in FIG. 1 is shown in FIG. 3. Again, corresponding elements have been given corresponding reference numerals. FIG. 3 shows the position of electret 22 with respect to conducting plate 17 when mass 12 is in the position shown in FIG. 1.

A spherical embodiment of the dual function transducer is shown in FIG. 4. The transducer includes a base 35 having a seat 37 for receiving a sphere 40. Sphere 40 includes a region of electret 42 analogous to electret 22 on cylinder 12. One or more conductive regions 44 are formed in seat 37.

In operation sphere 40 is suspended by fluid (not shown) in seat 37 in the same manner as cylinder 12 is suspended by fluid 25. By inducing oscillations in the fluid, the relative motion between sphere 40 and base 35 will cause displacement currents to flow through leads (not shown) connected to each antenna 44. As described in conjunction with FIG. 2, rotation of sphere 40 will cause different areas of electret 42 to be projected onto antennas 44, which thereby supply displacement current output signals indicative of the angular position of sphere 40 relative to base 35.

The apparatus of FIG. 4 can be used as an instrument for leveling a surface on which base 35 is disposed. In such embodiments a portion 47 of sphere 40 may be removed to cause sphere 40 to align itself with respect to the local gravity force. (Alternatively weight may be added to the bottom of sphere 40). Such apparatus may be used in place of a two-axis pendulum, for example, for insuring that bore holes are drilled vertically.

Numerous modifications to the structure shown in the drawings and discussed herein may be made without departing from the scope of the invention as defined by the appended claims. For example, mechanical devices or electromagnets may be used to generate the oscillations necessary to create the displacement currents. Alternatively, displacement currents may be generated without an oscillating device if mass 12, because of the mechanical environment in which it is situated, vibrates. Various changes in the shape and arrangement of mass 12, base 11 and conductive regions 17 and 18 may be made. For example, the base may be made to completely encircle mass 12 and include many regions of conductive material such as 17 and 18. In this manner, the angular position of mass 12 can be detected in numerous other locations. Further, the relative positions of the electret and the antenna may be interchanged, or multiple regions of electret and antenna may be used in which some regions of electret are formed on the mass and other regions of electret are formed on the base. The viscosity or other characteristics of the fluid 25 may be adjusted to provide viscous damping or other desired properties.

What is claimed is:

1. Apparatus for detecting the position of a mass comprising:
    a base;
    a mass disposed above the base and ohmically separated from the base;
    means for periodically inducing relative motion between the mass and the base;
    at least one field means disposed on one of the base or the mass for generating an electric field; and
    a plurality of electrically conductive means at least one of which is disposed on the other of the base or the mass to interact with the field means, the interaction of the at least one electrically conductive means with the field means inducing a displacement current in at least one of the electrically conductive means, the displacement current being related to the position of the mass.

2. Apparatus as in claim 1 wherein the plurality of electrically conductive means includes at least two conductive regions on the base ohmically separated from the base, and all of the at least two conductive regions are connected to a differential amplifier to thereby generate a signal related to the position of the at least one field means.

3. Apparatus as in claim 1 wherein:
    the base includes a depression in its upper portion; and
    a dielectric fluid at least partially fills the depression.

4. Apparatus as in claim 3 wherein the means for periodically inducing relative motion between the mass and the base includes means for inducing vibrations in the fluid.

5. Apparatus as in claim 4 wherein the means for inducing vibrations in the fluid includes a piezoelectric element connected to the base.

6. Apparatus as in claim 3 wherein:
    the depression has a curved cross section; and
    the mass has a curved cross section and is separated by the fluid from the base.

7. Apparatus as in claim 6 wherein the means for periodically inducing relative motion between the mass and the base includes means for inducing vibrations in the fluid.

8. Apparatus as in claim 6 wherein:
    the at least one field means is disposed on the mass; and
    the plurality of electrically conductive means includes two conductive plates disposed on the base.

9. Apparatus as in claim 8 wherein:
    the mass has a circular cross section of first radius; and
    the at least one field means is an electret on the surface of the mass.

10. Apparatus as in claim 9 wherein the depression is an arc of a circle having a radius larger than the first radius.

11. Apparatus as in claim 10 wherein a differential amplifier is connected to each of the conductive regions.

* * * * *